July 25, 1967 C. K. STUDLEY ETAL 3,333,066

MAGNETIC HEAD ASSEMBLY HAVING ROTATABLE AND SEPARABLE POLE PIECES

Original Filed Jan. 3, 1961 3 Sheets-Sheet 1

WILLIAM T. FROST & CLARENCE K. STUDLEY
INVENTORS.

BY Robert S. Clay
ATTORNEY

July 25, 1967 C. K. STUDLEY ETAL 3,333,066
MAGNETIC HEAD ASSEMBLY HAVING ROTATABLE
AND SEPARABLE POLE PIECES
Original Filed Jan. 3, 1961 3 Sheets-Sheet 2

WILLIAM T. FROST &
CLARENCE K. STUDLEY
INVENTORS

BY Robert G. Clay

ATTORNEY

WILLIAM T. FROST &
CLARENCE K. STUDLEY
INVENTORS

BY Robert G. Clay
ATTORNEY

United States Patent Office 3,333,066

Patented July 25, 1967

3,333,066
MAGNETIC HEAD ASSEMBLY HAVING ROTATABLE AND SEPARABLE POLE PIECES

Clarence K. Studley, Los Altos, and William T. Frost, Los Gatos, Calif., assignors to Ampex Corporation, Redwood City, Calif., a corporation of California Continuation of application Ser. No. 80,478, Jan. 3, 1961. This application July 29, 1964, Ser. No. 392,063

6 Claims. (Cl. 179—100.2)

This application is a continuation of Ser. No. 80,478, filed Jan. 3, 1961, now abandoned.

This invention relates to magnetic tape recording and reproducing systems and devices, and particularly to magnetic head assemblies for contact operation with a magnetic record surface.

Contact magnetic recording techniques are now widely used in many different data processing and memory systems. Such techniques provide particular advantages for both recording and reproducing heads, and are used with various record mediums, which usually are in the form of a magnetic surface material supported upon a suitable backing or carrier. Whether the backing is a plastic or metal tape, or a drum, certain substantial problems are commonly presented when the head contacts the magnetic surface.

As is well known, magnetic heads are shaped to function as an electromagnet having slightly separated pole tips which define a narrow but precise nonmagnetic gap. The pole tips are the parts of the head which are held in contact with a record medium. The configurations of the pole tips and the gap which they define must be closely controlled for proper sensitivity and frequency response. For example, the gap length should normally be shorter than the smallest wavelength to be recorded and reproduced. The depth of the gap, in a direction normal to the record medium, should normally be limited in order to maintain high sensitivity. Accordingly, when it is desired to record signals of extremely short wavelengths or high frequencies, such as signals in the video frequency band, the gap length and gap depth must be extremely small. At the same time, when recording and reproducing video or other wideband signals, an extremely high relative velocity must be maintained between the head and the record medium. With a gap depth which is kept relatively small in order to attain sufficient sensitivity, the pole tips are worn down and must be replaced within a relatively short time. Although these systems usually use magnetic tape, similar problems exist with high speed magnetic drum systems, in which head life is limited to a relatively few hours even if the drum surface is made extremely hard and is very finely polished.

It is therefore an object of the present invention to provide an improved magnetic head assembly for contact recording applications.

Another object of the present invention is to provide a magnetic head for contact recording in which high sensitivity and good electrical properties may be attained, with relatively inexpensive and simple parts.

Another object is to provide an improved recording and reproducing head assembly for contact recording magnetic systems, with the operative segments of the magnetic head assemblies having longer life and better electrical characteristics but at the same time being less expensive than assemblies heretofore available.

According to the present invention, a magnetic head assembly is formed of a permanent part including a fixed core of magnetic material, and a replaceable part consisting of magnetic elements which define at least two pairs of pole tips. The replaceable part is structurally and magnetically coupled to the permanent part in such a way that each of the pole tips is in contact with the record medium at a selected point, and a low reluctance magnetic path which extends through the fixed magnetic core of the permanent part is established between the pole tips. The replaceable part is so configured that when the operative pole tips have abraded a predetermined amount, the replaceable part may be shifted in position relative to the permanent part such that a new pair of pole tips contact the record medium for recording and reproducing signals.

In a particular magnetic head assembly in accordance with the invention, the replaceable part is formed of two core portions of magneticaly soft material which define the two halves of a generally oval structure and provide two pole tip pairs. Nonmagnetic gap spacers are placed between each pair of pole tips. The permanent part of the assembly contains a fixed, magnetic core portion which is adjacent to, but out of contact with, the record medium. An energizing or pickup coil is wound around this core portion. The replaceable part is then coupled to the permanent part, with each pole tip of one of the pole tip pairs being adjacent to the magnetic core of the permanent part. Each of these pole tips also is in contact with the record medium during recording or reproducing operations. The core in the permanent part completes a magnetic path of low reluctance passing between the pole tips which contact the record medium. The head assembly may then be used for recording or playback, employing the coil which is about the magnetic core in the permanent part. When the operative pole tips have been abraded by a predetermined amount, the replaceable member is rotated 180° to place the hitherto unused pair of pole tips in contact with the record medium. When these pole tips are worn out in turn, a new replaceable member may be readily and easily installed. With this arrangement, either pair of the pole tips is precisely positioned relative to the record medium, but all of the elements which must be replaced are relatively simple and inexpensive.

A better understanding of the invention may be had by reference to the following description, taken in conjunction with the accompanying drawings, in which.

Figures 1, 3:
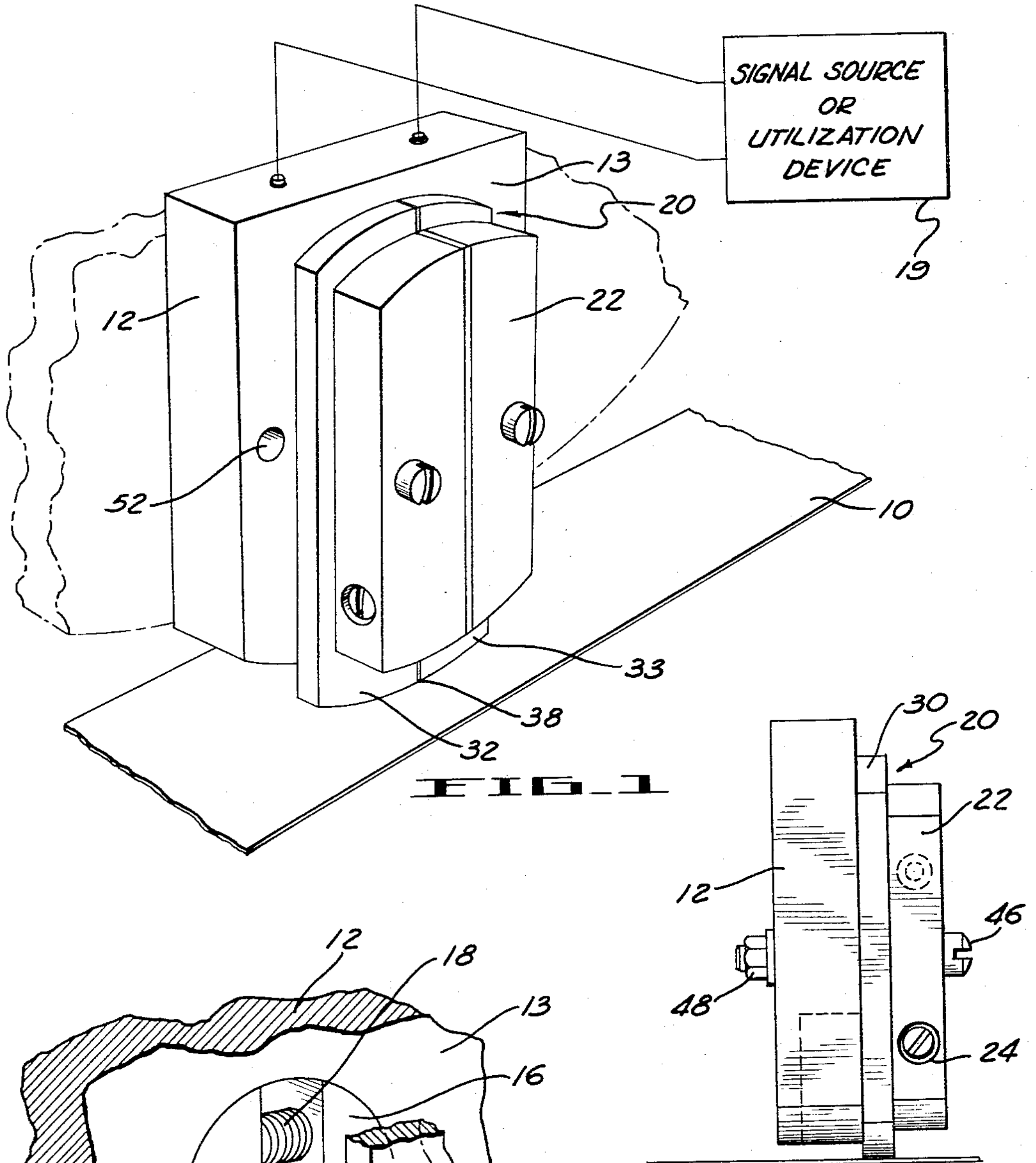
FIGURE 1 is an enlarged perspective view of a magetic head assembly in accordance with the present invention.
FIGURE 3 is a side view of the magnetic head assembly of FIGURE 1.

Magnetic head assemblies in accordance with the present invention, as shown in FIGURES 1 through 4, place the operative pole tips in contact with a recording surface, such as the magnetic tape 10 shown in FIGURE 1. The associated drive and guide system for the tape 10 have not been shown in order to simplify the drawings. The magnetic head assembly includes a base or permanent member 12, best seen in FIGURES 2 and 3, which is close to but spaced apart by a selected distance from the magnetic tape 10. The base member 12 includes a flat or planar surface 13 (FIGURE 2 particularly) against which other parts of the magnetic head assembly are to be mounted. This planar surface 13 is parallel to the longitudinal dimension of the nonmagnetic gap formed by the assembly. With conventional longitudinal recording relative to the tape 10, the planar surface 13 is parallel to the direction of movement of the tape 10. With a rotary head assembly of the tape used for wideband video recording, however, the base member 12 is positioned such that the surface 13 is transverse to the direction of elongation and movement of the tape 10.

Figure 4:
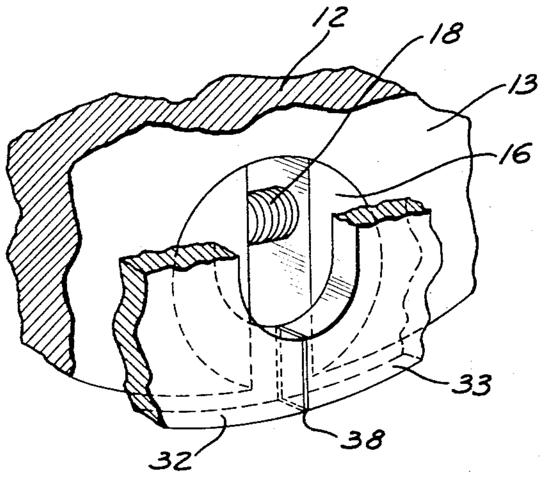
FIGURE 4 is a perspective view of a fragment of the magnetic head assembly of FIGURE 1, showing the magnetic elements in greater detail.
Figure 2:
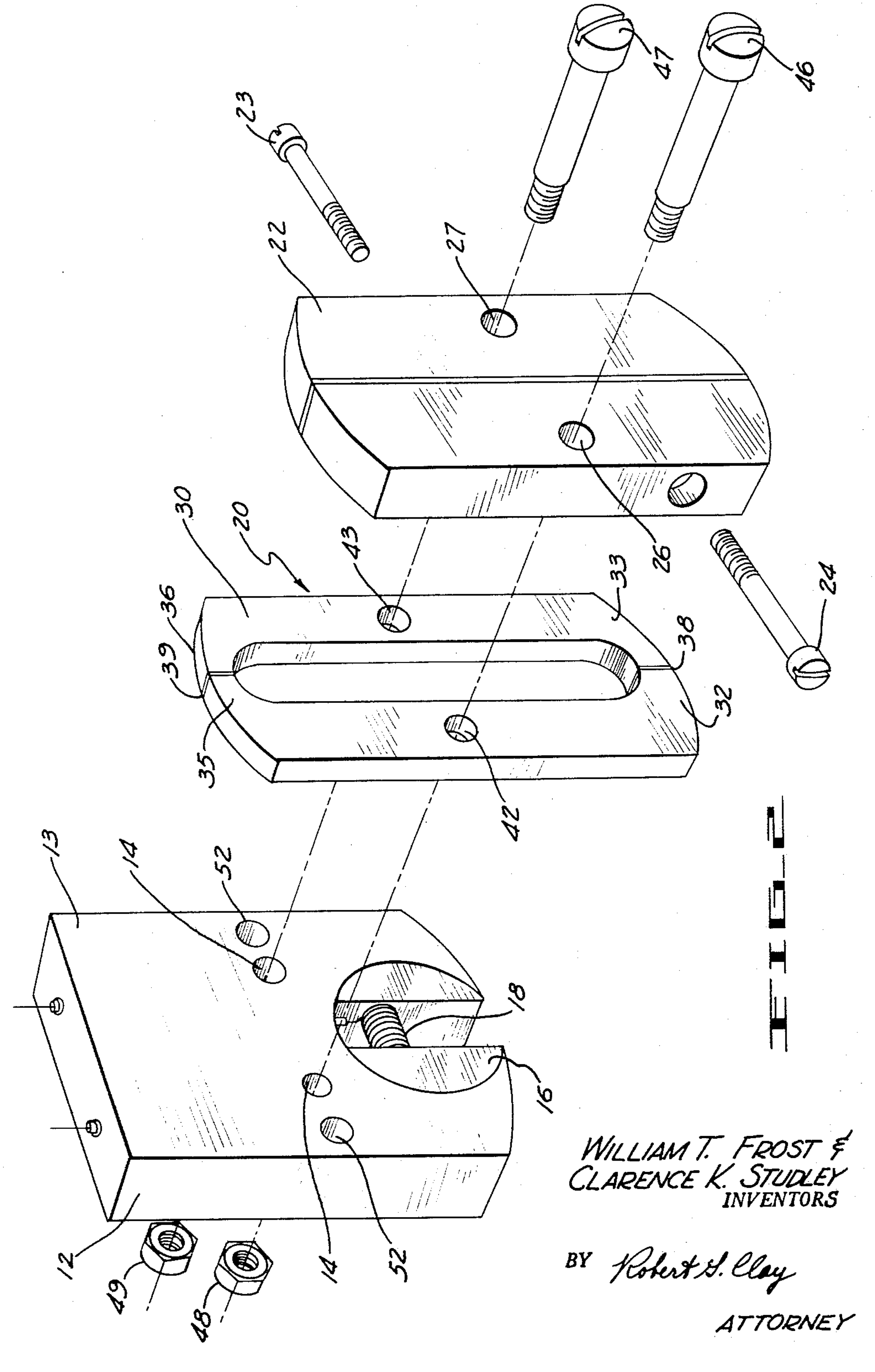
FIGURE 2 is an exploded view of the various elements of the magnetic head assembly of FIGURE 1.

The base member 12 also is provided with precisely spaced positioning holes 14 (FIGURE 2) which are normal to the planar surface 13. The magnetic head assembly is positioned for operation at a selected recording point or zone, relative to the tape 10, and the positioning holes 14 are symmetrically placed on either side of a plane which includes the recording point and is transverse to the direction of movement of the tape 10. The base member 12 also includes a recess adjacent the recording point in which is set a fixed magnetic core member 16 (FIGURES 2 and 4). The fixed core member 16 is preferably of a ferrite material, and includes a side surface which is substantially flush with the planar surface 13 of the base member 12. The fixed core member 16 has a configuration which is generally C-shaped or U-shaped, these terms being used to denote the form which includes a pair of parallel or somewhat parallel legs, and a joining leg between them. The free ends of the parallel legs are in this structure spaced a greater distance apart than is employed for an operative nonmagnetic gap. A coil 18 (FIGURES 2 and 4) for recording or reproducing signals is wound around the joining leg of the permanent core member 16. Terminal leads from the coil 18 extend out through suitable apertures in the base member 12 to an appropriate signal source or utilization device 19 (FIGURE 1 only).

The pole piece member 30 also includes positioning holes 42, 43 (FIGURE 2 only) registering with the positioning holes 14 in the base member 12 and the like holes 26, 27 in the mounting plate 22. The parts of the complete assembly are held together by mounting bolts 46, 47 (FIGURES 2 and 3) inserted through one side and suitably held at the opposite side, as by nuts 48, 49. The manner in which the elements are held together is, of course, not of significance as long as precision and rigidity are obtained. The base member 12 may also include threaded holes 52 for fixture to an external frame (not shown).

The operation of the system, referring to FIGURES 1 through 4, may now be explained with reference to the performance of a recording function. Signals provided from an external source 19 energize the coil 18, thus establishing a magnetic field in the fixed core member 16. The magnetic field flux lines seek a low reluctance path, and this is provided by the fixed core member 16 and the adjacent pair of pole tips 32, 33 (see FIGURE 4 particularly). In effect, the principal part of the magnetic loop is provided by the permanent core member 16, and the operative segments of the magnetic loop, for recording purposes, are provided by the adjacent pole tip pair 32, 33. The flux lines which bridge the short nonmagnetic spacer 38 pass through the magnetic layer at the surface of the tape 10, to alter the magnetic pattern and provide a recording in a well known manner.

It is noted that with the embodiment of the present invention a considerably lower reluctance is presented in the magnetic path including the fixed core member 16 and tips 32 and 33, than is presented by the alternate path which includes the second pole tip pair 35, 36. This arrangement therefore operates as an essentially unitary magnetic head assembly having high efficiency and linearity. Because an additional pair of pole tips 35, 36 is ternal knob 61. The shaft 60 also registers with a sliding fit in an appropriate aperture in the base member 12. On the opposite side from the knob 61, the shaft 60 terminates in a collar 63, and a compression spring 65 between the collar 63 and the base member 12 urges the pole piece member 54 against the base member 12. For angular positioning of the replaceable member 20, the planar surface 13 of the base member 12 includes notched alignment recesses 67 (not all of which can be seen in FIGURES 5 and 6) symmetrically disposed about the shaft 60. The shaft 60 includes an alignment tooth 68 which is shaped to register in any of the alignment recesses 67.

With this arrangement, any of the four different pole tip pairs may be used for recording and reproducing purposes. After one pole tip pair has been worn down by a selected amount, a new and unused pole tip pair may be placed in position by simply drawing the mounting plate 58 and pole piece member 54 away from the planar surface 13, by overcoming the force of the spring 65, and then rotating the entire replaceable member 20 until the alignment tooth 68 settles into a different notched recess 67. The number of pole tip pairs on a pole piece member, and the manner in which the pole piece member is set into position may of course be widely varied depending upon particular requirements of a system and the configuration selected.

Figures 5, 6, 7:
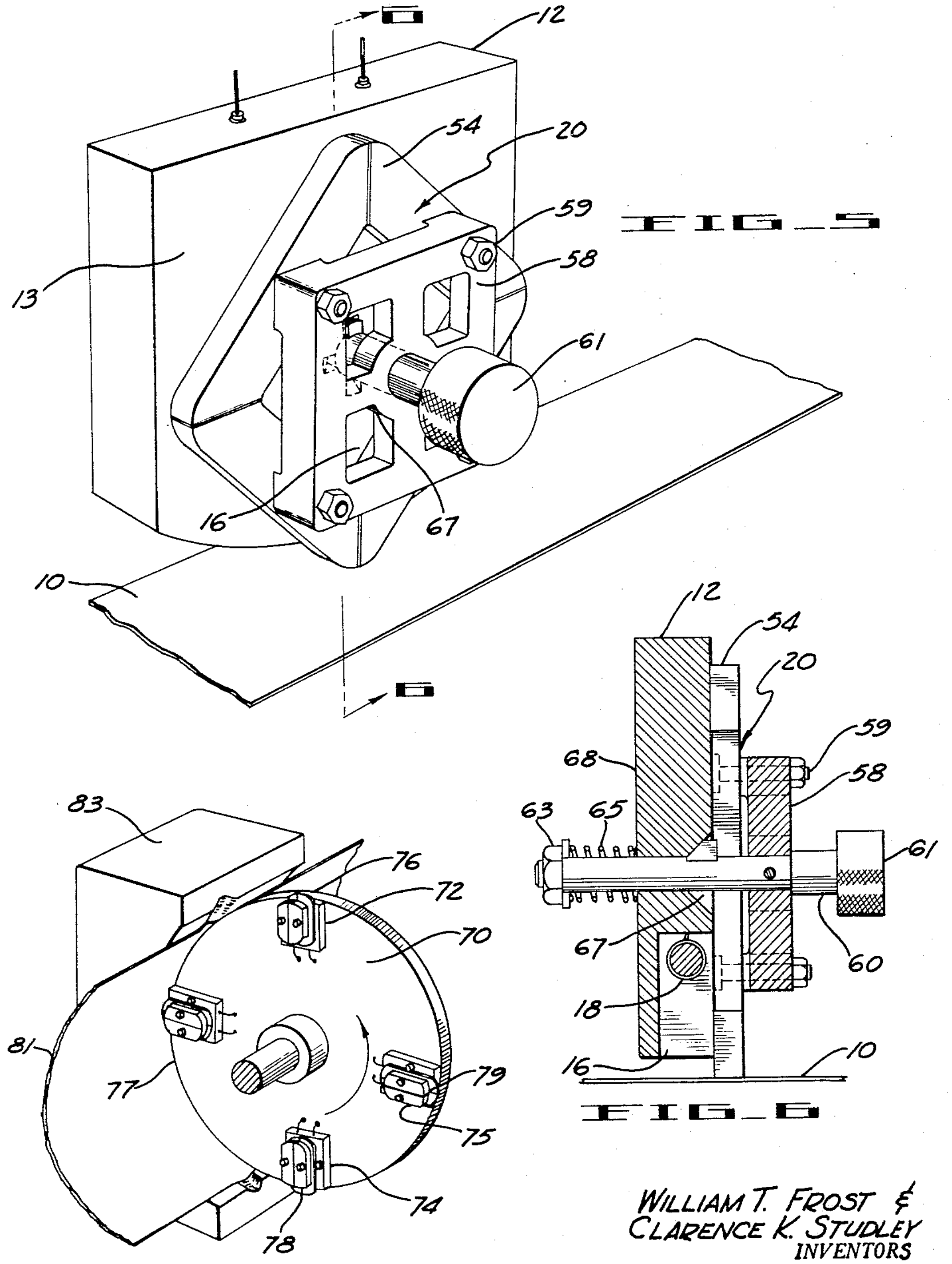
FIGURE 5 is a perspective view of an alternative magnetic head assembly in accordance with the invention.
FIGURE 6 is a side sectional view of the arrangement of FIGURE 5, taken along the line 6—6 and looking in the direction of the appended arrows.
FIGURE 7 is a perspective view of another magnetic head assembly in accordance with the present invention.

The usefulness of magnetic head assemblies in accordance with the invention in transverse track systems typically used for wideband or video recording may be understood with respect to FIGURE 7. The extremely high relative velocity between head and tape, and the necessity for contact recording under appreciable pressure in order to obtain high sensitivity, inevitably cause high speed abrasion of the magnetic heads in these systems. Replacement of an entire head assembly is extremely expensive, and replacement of only the magnetic head parts of the rotary head assembly has heretofore been very difficult and time-consuming. As shown in FIGURE 7, however, a rotary head assembly in accordance with the present invention minimizes the difficulties.

In this system the base member for the four magnetic heads which are to be utilized is a single nonmagnetic disk 70. A group of four fixed core members, each having an associated coil, is inset at symmetrically placed points about the periphery of the disk 70. These elements are disposed in the manner shown in detail in conjunction with FIGURES 1–4. A separate replaceable member 72–75 is mounted adjacent each of the fixed core members on the disk 70. Each replaceable member 72–75 includes a different pole piece member 76–79 of the type having two pole piece pairs. The shapes and mounting used again correspond to those of FIGURES 1–4. For proper transverse track recording, the relatively wide tape 81 is cupped about the disk 70 by a female guide member 83, the servo, synchronizing and signal processing systems which are also used being omitted here for simplicity.

Each of the four pole piece members 76–79 which are successively in contact with the magnetic tape are worn substantially equally during rotation of the disk 70. After a certain number of hours of operation, depending upon the system and the operating conditions, each of the pole piece members 76–79 may be loosened, rotated 180° and set back into place with new pole tip pairs in contact with the tape 81. In the event that individual adjustments are desired, means may be provided for radially adjusting the position of the replacement member relative to the disk 70. When all of the sets of pole tip pairs have been worn down more than the predetermined amount, each of the pole piece members 76–79 may then be replaced with a new and unused pole piece member.

Thus there has been described an improved magnetic head assembly having an improved magnetic configuration for permitting the achievement of longer magnetic head life with a contact recording system. The assembly utilizes a fixed and permanently positioned core member and replaceable, rotatable magnetic pole tips which are in contact with the recording surface and which complete a magnetic flux path with a fixed core member.

What is claimed is:

1. A magnetic head assembly, comprising:
non-magnetic base member;
magnetic member defining a principal portion of a low reluctance path mounted in said base member and positioned adjacent to a recording surface;
independent magnetic pole piece member including at least two pole tip pairs; and
means for rotatably and selectively mounting said pole piece member against said base member with a selected one of said pole tip pairs being positioned adjacent said recording surface and adjacent to said magnetic member such that the low reluctance magnetic path extends from only one pole tip pair and around said magnetic member.

2. A magnetic head assembly, comprising:
non-magnetic base member;
magnetic member defining a principal portion of a low reluctance magnetic path mounted in said base member and positioned adjacent to a recording surface;
magnetic pole piece member including at least two peripheral pole tip pairs, said pole piece member having only one of said pole tip pairs in contact with said magnetic member in the vicinity of said recording surface, said magnetic pole piece member having said other pole tip pair in contact with said base member and substantially magnetically short-circuited by said low reluctance magnetic path of said magnetic member; and
means for rotatably mounting said pairs of pole tips to enable selective movement of said pole tip pairs into contact with said recording surface while simultaneously removing the other of said pole tip pair from contact with said recording surface.

3. A magnetic head assembly, comprising:
non-magnetic base member;
magnetic member defining a principal portion of a low reluctance magnetic path mounted in said base member and positioned adjacent to a recording surface;
magnetic pole piece member including at least two independent peripheral pole tip pairs, said pole piece member having only one of said pole tip pairs in contact with said magnetic member in the vicinity of said recording surface, said magnetic pole piece member having said other pole tip pair in contact with said base member to substantially magnetically insulate said other pole tip pair from said low reluctance magnetic path of said magnetic member; and
means for rotatably mounting said pairs of pole tips to enable selective movement of said pole tip pairs into contact with said recording susface while simultaneously removing the other of said pole tip pair from contact with said recording surface.

4. A magnetic head assembly for mounting adjacent a recording surface and providing contact recording and reproducing at a recording zone on the recording surface, comprising: a base member positioned adjacent to the recording surface but spaced apart therefrom, said base member having a flat surface extending parallel to the direction of relative movement between the head assembly and the recording surface, said base member including a pair of alignment apertures which are symmetrically placed with respect to the recording zone; a ferrite core member positioned in said base member adjacent to the recording zone and providing the principal portion of a magnetic flux path; a coil wound about the ferrite core member; a multi-gap magnetic head structure having a central opening and a flat side, with the magnetic gaps being symmetrically spaced about the periphery of said head structure relative to the central opening and the parts of said head structure adjacent to the periphery defining pole tip pairs for magnetic recording and reproducing, said head structure also including positioning apertures registerable with the positioning apertures of said base member and spaced such that when aligned with the positioning apertures of said base member a related pair of pole tips is presented at the recording zone on the recording surface, and detachable mounting plate means including positioning elements insertable through the positioning apertures of said head structure and base member for holding said head structure in fixed relation to said base member with a related pair of pole tips at the recording zone.

5. A magnetic head assembly comprising: a base member of nonmagnetic material positioned adjacent to a recording zone on a record medium; a fixed, magnetic core member mounted in said base member adjacent to the record medium; a coil wound around a part of said fixed core member, said base member and fixed core member having a planar surface lying in a plane parallel to the direction of relative movement between said record medium and said base member; a magnetic pole piece member having a planar surface for registry against the planar surface of said base member and fixed core member, and having a central aperture; nonmagnetic spacer elements positioned symmetrically about the periphery of said pole piece member and defining separate magnetic pole tip pairs; mounting plate means detachably engaging said magnetic pole piece member; and spring loaded means coupled to said mounting plate means for urging said magnetic pole piece member into contact with the planar surface of said base member, with an individual pair of pole tips being closely adjacent to and magnetically coupled with said fixed core member, each of the pole tips being coupled with a different part of said fixed core member on opposite sides of said coil.

6. A magnetic head assembly comprising: a base member; a fixed magnetic core member of generally C-shaped configuration mounted in said base member adjacent to but spaced apart from a recording zone on a record medium; a coil wound around an adjoining leg of said C-shaped fixed core member, said base member and fixed core member together having a substantially flush planar surface lying in a plane parallel to the direction of movement of the record medium relative to said base member, said base member including a central aperture and alignment recesses symmetrically disposed about the aperture; a planar magnetic pole piece member having a closed loop configuration and a central aperture, said magnetic pole piece member including a planar surface for registry with the planar surface of said base member; nonmagnetic gap spacers positioned symmetrically about said magnetic pole piece member to define separate pole tip pairs therein, such that said magnetic pole piece member provides a substantially high reluctance magnetic path about the closed loop; a mounting plate detachably coupled to said magnetic pole piece member; a central shaft registering with the central aperture in said base member and fixedly coupled to said mounting plate, said central shaft including an alignment tooth adapted to register with any of the alignment recesses in said base member, such that when the alignment tooth registers with any selected alignment recess, a correspondingly selected pole tip pair is presented in position at the recording zone on the record medium, with each pole tip from the pair being in contact with a different free leg of said C-shaped fixed core member, such that a low reluctance magnetic path exists between the pole tip pair and said fixed core member; and spring means coupled to said central shaft and engaging said fixed base member for urging said pole piece member into close association with the planar surface of said base member and for magnetic coupling with said fixed core member.

References Cited

UNITED STATES PATENTS

| | | | |
|---|---|---|---|
| 2,547,737 | 4/1951 | Blaney | 179—100.2 |
| 2,745,905 | 5/1956 | Bobb | 179—100.2 |
| 2,923,779 | 2/1960 | Namenyi-Katz | 179—100.2 |
| 3,171,903 | 3/1965 | Wheeler et al. | 179—100.2 |

BERNARD KONICK, *Primary Examiner.*

L. G. KURLAND, *Assistant Examiner.*